(12) United States Patent
Uchimura et al.

(10) Patent No.: US 10,978,931 B2
(45) Date of Patent: Apr. 13, 2021

(54) MOTOR WITH SPEED REDUCTION MECHANISM

(71) Applicant: Mitsuba Corporation, Gunma (JP)

(72) Inventors: Hiroyuki Uchimura, Gunma (JP); Taihei Kagawa, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 46 days.

(21) Appl. No.: 16/314,039

(22) PCT Filed: May 31, 2017

(86) PCT No.: PCT/JP2017/020284
§ 371 (c)(1),
(2) Date: Dec. 28, 2018

(87) PCT Pub. No.: WO2018/003387
PCT Pub. Date: Jan. 4, 2018

(65) Prior Publication Data
US 2019/0334410 A1    Oct. 31, 2019

(30) Foreign Application Priority Data

Jun. 29, 2016 (JP) .............................. JP2016-128567

(51) Int. Cl.
*H02K 7/116* (2006.01)
*F16H 1/16* (2006.01)
(Continued)

(52) U.S. Cl.
CPC ............... *H02K 7/116* (2013.01); *F16D 3/68* (2013.01); *F16H 1/16* (2013.01); *F16H 55/14* (2013.01)

(58) Field of Classification Search
CPC ........ H02K 7/116; H02K 7/1166; H02K 5/08; F16H 1/16; F16H 57/023; F16H 57/039;
(Continued)

(56) References Cited

U.S. PATENT DOCUMENTS 4,652,781 A * 3/1987 Andrei-Alexandru ...................... B60J 7/0573
192/12 BA
5,564,981 A * 10/1996 Iwabuchi .................. F16D 3/68
464/73
(Continued)

FOREIGN PATENT DOCUMENTS

DE    102008013531 A1 * 9/2009 ............... F16D 3/68
DE    102013221147 A1    4/2015
(Continued)

OTHER PUBLICATIONS

International Search Report for PCT Serial No. PCT/JP2017/020284 dated Aug. 15, 2017.

*Primary Examiner* — Burton S Mullins
(74) *Attorney, Agent, or Firm* — McCormick, Paulding & Huber PLLC

(57) ABSTRACT

A damper member (80) is provided between the worm wheel (39) and the output member (70), and elastically deformed by a relative rotation of the worm wheel (39) and the output member (70), a gap portion (SP) is provided between the worm wheel (39) and the output member (70), a portion (DP) bulged by elastic deformation of the damper member (80) is housed in the gap portion (SP), the portion (DP) bulged by elastic deformation of the damper member (80) does not push the output member (70) away from the worm wheel (39). Therefore, although it has the damper member (80), it is not necessary to fix the output member (70) so as to prevent the output member (70) from being moved in an axial direction of a support shaft by using a fixing member
(Continued)

on the basis of a conventional manner, thereby making it possible to reduce the intensity of the support shaft, and consequently, it is possible to realize excellent shock resistance and silence, and cost reduction.

8 Claims, 12 Drawing Sheets

(51) Int. Cl.
  *F16D 3/68* (2006.01)
  *F16H 55/14* (2006.01)
(58) Field of Classification Search
  CPC ...... E05F 15/697; E05Y 2900/55; F16D 3/68; F16D 3/12
  USPC ..................... 310/51, 83; 464/87, 88, 92, 73
  See application file for complete search history.

(56) References Cited

U.S. PATENT DOCUMENTS

| | | | | |
|---|---|---|---|---|
| 6,169,346 | B1 * | 1/2001 | Nakamura | H02K 7/1166 310/75 D |
| 6,393,929 | B1 * | 5/2002 | Quere | F16H 1/16 74/411 |
| 6,591,707 | B2 * | 7/2003 | Torii | F16D 3/68 74/425 |
| 7,571,660 | B2 * | 8/2009 | Ota | F16H 1/16 74/425 |
| 8,627,745 | B2 | 1/2014 | Uchimura | |
| 9,574,616 | B2 * | 2/2017 | Hakamata | H02K 7/003 |
| 2002/0052242 | A1 | 5/2002 | Tabuchi et al. | |
| 2011/0133584 | A1 | 6/2011 | Uchimura | |

FOREIGN PATENT DOCUMENTS

| | | | | |
|---|---|---|---|---|
| EP | 002103842 A1 * | 9/2009 | ............... | F16H 1/16 |
| JP | H05025029 U | 4/1993 | | |
| JP | H05094562 U | 12/1993 | | |
| JP | H09131019 A | 5/1997 | | |
| JP | 2002139122 A | 5/2002 | | |
| JP | 2002147487 A | 5/2002 | | |
| JP | 2010045955 A | 2/2010 | | |
| JP | 2010124598 A | 6/2010 | | |
| JP | 2012080775 A | 4/2012 | | |

* cited by examiner

TQ1: LOAD TORQUE HAVING MAGNITUDE CORRESPONDING TO WEIGHT OF WINDSHIELD
TQ2: LOAD TORQUE HAVING MAGNITUDE CAUSING OUTPUT MEMBER TO ABUT ON STOPPER

MOTOR WITH SPEED REDUCTION MECHANISM

CROSS-REFERENCE TO RELATED APPLICATIONS

This application is a National Stage application of International Patent Application No. PCT/JP2017/020284, filed on May 31, 2017, which claims priority to Japanese Patent Application No. 2016-128567 filed on Jun. 29, 2016, each of which is hereby incorporated by reference in its entirety.

TECHNICAL FIELD

The present invention relates to a motor with speed reduction mechanism including: a motor section having a rotation shaft; and a gear section having a speed reduction mechanism configured to reduce the rotation of the rotation shaft.

BACKGROUND

Conventionally, a motor with speed reduction mechanism is used as a drive source of a power window apparatus or the like mounted on a vehicle such as automotive vehicle, and it is small but can obtain a large output. The motor with speed reduction mechanism includes: a motor section having a rotation shaft; and a gear section having a speed reduction mechanism configured to decelerate the rotation of the rotation shaft. By driving the motor section, the rotation of the rotation shaft is decelerated to a predetermined specified speed by the speed reduction mechanism, and the decelerated and high-torque output is output to the window regulator or the like. For example, techniques for as such a motor with speed reduction mechanism are known and described in Japanese Patent Application Laid-Open Publication No. 2010-045955 and Japanese Patent Application Laid-Open Publication No. 2012-080775.

A motor with speed reduction mechanism disclosed in Japanese Patent Application Laid-Open Publication No. 2010-045955 includes: a worm wheel forming part of a speed reduction mechanism; and an output gear (output member) configured to output the decelerated rotation of the worm wheel to the outside. A damper member is provided between the worm wheel and a driven plate integrally provided with the output gear to reduce abrupt torque transmission. An elastic portion of the damper member is disposed between a protrusion protruding in the axial direction of the worm wheel along the circumferential direction of the worm wheel and a protrusion protruding in the axial direction of the driven plate, and the elastic portion of the damper member is disposed between the worm wheel and the driven plate along the axial direction of the worm wheel. As a result, an impact transmitted from the window regulator is alleviated, and damage to the speed reduction mechanism, generation of noise, and the like are suppressed in this manner.

On the other hand, the motor with speed reduction mechanism described in Japanese Patent Application Laid-Open Publication No. 2012-080775 does not include a damper member as described in Japanese Patent Application Laid-Open Publication No. 2010-045955. Specifically, a structure in which a small diameter portion (output member) having a serration portion and a large diameter portion (worm wheel) having a tooth portion are integrated is adopted in this motor. The reduction gear formed by integrating the small diameter portion and the large diameter portion is rotatably mounted on a support shaft integrated with the gear case. As described above, since the damper member is not provided in the motor with speed reduction mechanism disclosed in Japanese Patent Application Laid-Open Publication No. 2012-080775, the structure is simplified as compared with the motor with speed reduction mechanism disclosed in Japanese Patent Application Laid-Open Publication No. 2010-045955, and advantageous in reduction of the production cost.

SUMMARY

In the motor with speed reduction mechanism described in Japanese Patent Application Laid-Open Publication No. 2010-045955 described above, the portion of the damper member which is swelled by the elastic deformation pushes the output gear away from the worm wheel. Therefore, it is necessary to fix the output gear so as not to move in the axial direction of the support shaft by using a fastening member such as C-shaped retaining ring. In addition, since a relatively high stress acts on the support shaft in the axial direction thereof, it is necessary to secure the rigidity of the support shaft by forming the support shaft of steel material or the like.

Therefore, the inventor of the present invention considers that it is desirable to devise a structure in which a damper member can be applied to a motor with speed reduction mechanism as described Japanese Patent Application Laid-Open Publication No. 2012-080775 described above, which does not require a fastening member such as a C-shaped retaining ring or the like, a support shaft of high rigidity, or the like, and needs to devise a specific structure thereof.

It is an object of the present invention to provide a motor with speed reduction mechanism improved in impact resistance, silence, and production cost.

According to one aspect of the present invention, there is provided a motor with speed reduction mechanism, comprising: a motor having a rotation shaft; and a gear section having a reduction mechanism configured to reduce a rotation of the rotation shaft, wherein the motor with speed reduction mechanism comprises: a worm that is rotated by the rotation shaft; a worm wheel that is rotated by said worm; an output member configured to output a rotation of the worm wheel to the outside; a damper member provided between the worm wheel and the output member and elastically deformed by a relative rotation of the worm wheel and the output member; a bulged portion housing portion provided between the worm wheel and the output member, a portion bulged by elastic deformation of the damper member being housed in the bulged portion housing portion.

In another aspect of the present invention, the motor with speed reduction mechanism comprises: a torque output portion provided to the worm wheel and protruding toward the output member, and a torque receiving portion provided to the output member and protruding toward the worm wheel, wherein the damper member is provided between the torque output portion and the torque receiving portion along the rotation direction of the worm wheel, the bulged portion housing portion is provided between the damper member and the output member along an axial direction of the worm wheel.

In another aspect of the present invention, the motor with speed reduction mechanism comprises: a drum provided to the output member and configured to drive an object, a cable being wound around an outer circumference portion of the drum, and a drum cover covering the drum, wherein the output member is axially supported by the drum cover.

In another aspect of the present invention, the worm wheel is provided with a stopper portion configured to restrict the relative rotation of the output member by a predetermined angle or more.

In another aspect of the present invention, a load torque to be transmitted from the output member to the damper member satisfies the following expression, when a load torque corresponding to a weight of the object is defined as Tq1, and a load torque of a magnitude necessary to cause the output member to abut on the stopper portion is defined as Tq2, Tq1<Tq2.

In another aspect of the present invention, the damper member includes: a multiple of damper pieces elastically deformed between the worm wheel and the output member; and a connecting portion connecting adjacent damper pieces to each other, wherein the output member includes a movement regulating portion configured to regulate a movement of a coupling portion along the axial direction of the worm wheel.

In another aspect of the present invention, the coupling portion is provided between the worm wheel and the movement regulating portion along the axial direction of the worm wheel.

In another aspect of the present invention, the damper member includes: a multiple of damper pieces elastically deformed between the worm wheel and the output member; and a connecting portion connecting adjacent damper pieces to each other, the thickness dimension of the damper piece along the axial direction of the worm wheel and the thickness dimension of the connecting portion are the same as each other.

According to the present invention, since the damper member elastically deformed by the relative rotation of the worm wheel and the output member is provided between the worm wheel and the output member, and the bulged portion housing portion housing the portion swelled by the elastic deformation of the damper member is provided between the worm wheel and the output member, the portion swelled by the elastic deformation of the damper member does not press the output member away from the worm wheel.

This eliminates the require of immovably fixing the output member in the axial direction of the support shaft by using the fastening member as in the past while providing the damper member, thereby making it possible to reduce the intensity of the support shaft, and consequently, it is possible to realize excellent shock resistance and silence, and cost reduction.

DETAILED DESCRIPTION

Hereinafter, the first embodiment of the present invention will be described in detail with reference to the drawings.

Figure 1:
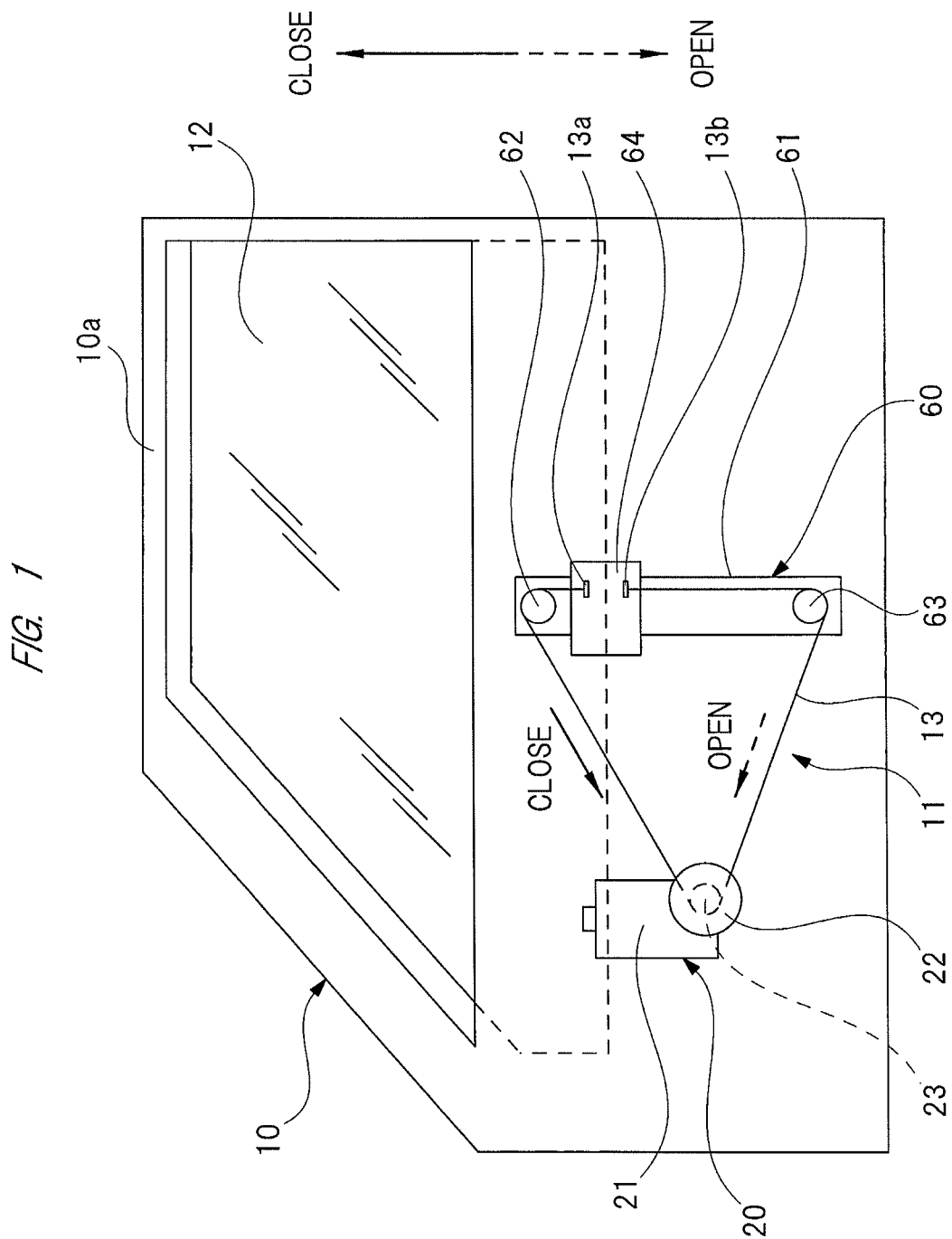
FIG. 1 is a schematic view showing a power window apparatus.
Figure 2:
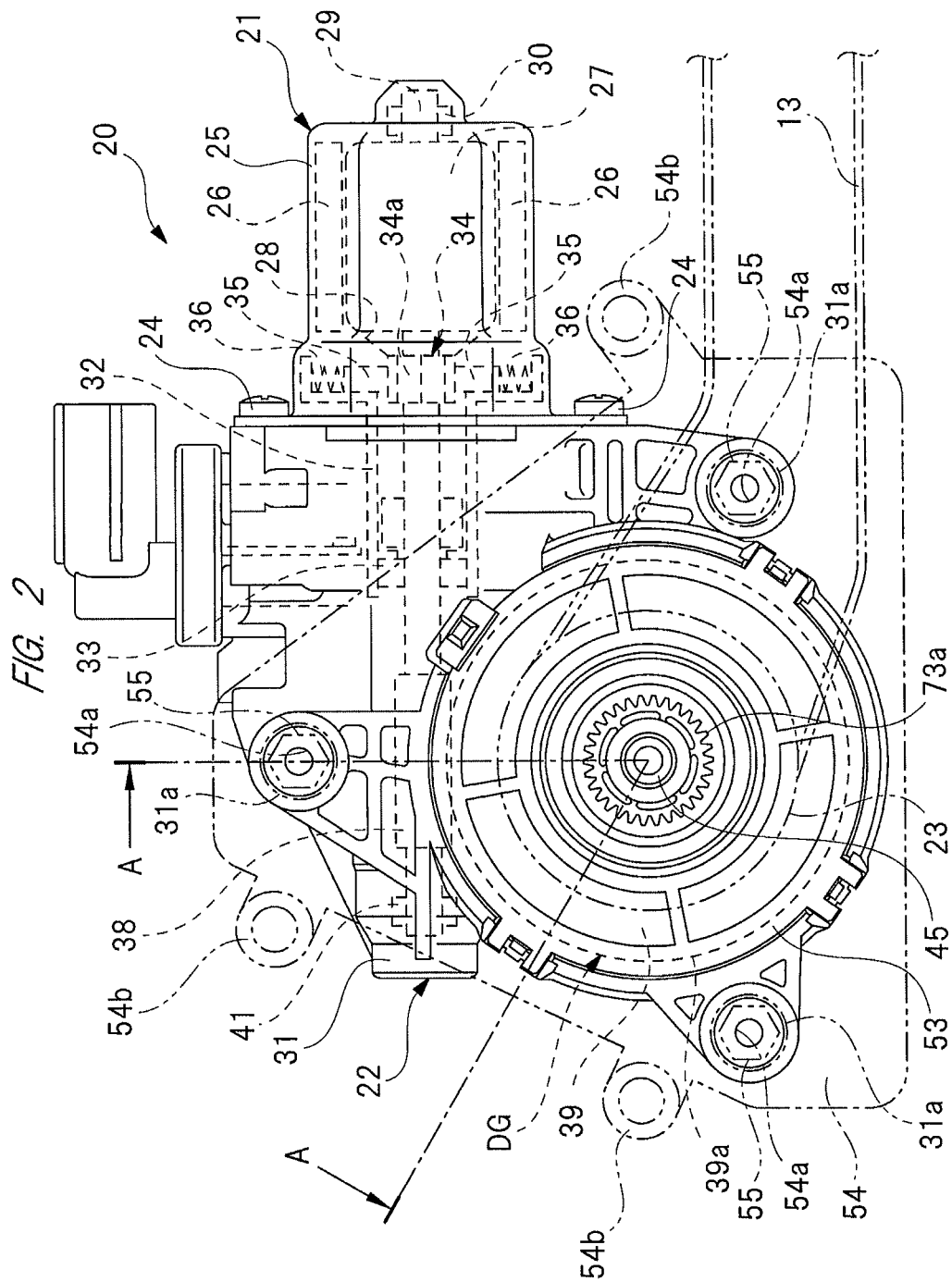
FIG. 2 is a plan view showing a motor with speed reduction mechanism according to the present invention.
Figure 3:
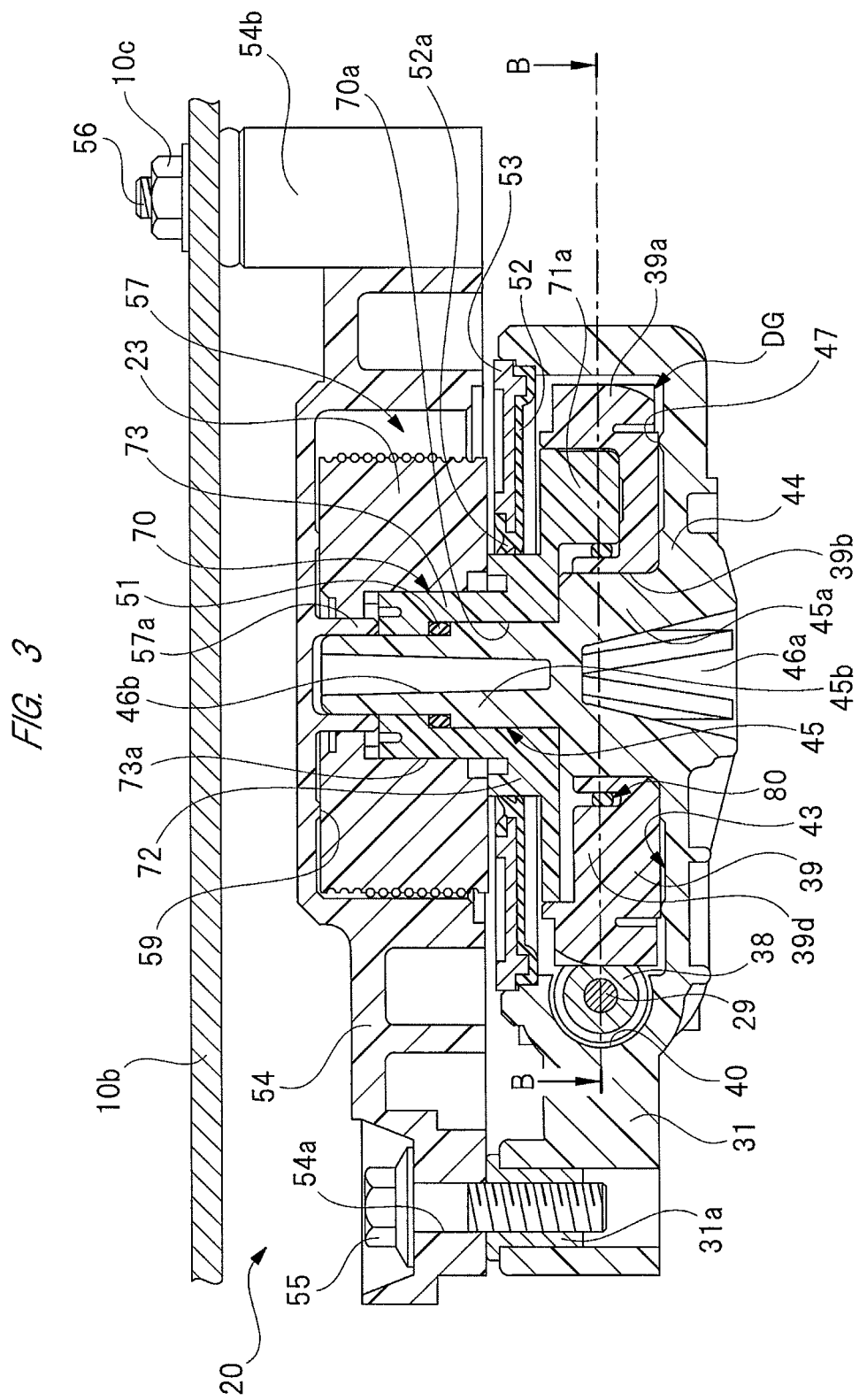
FIG. 3 is a cross-sectional view taken along line A-A of FIG. 2.
Figure 4:
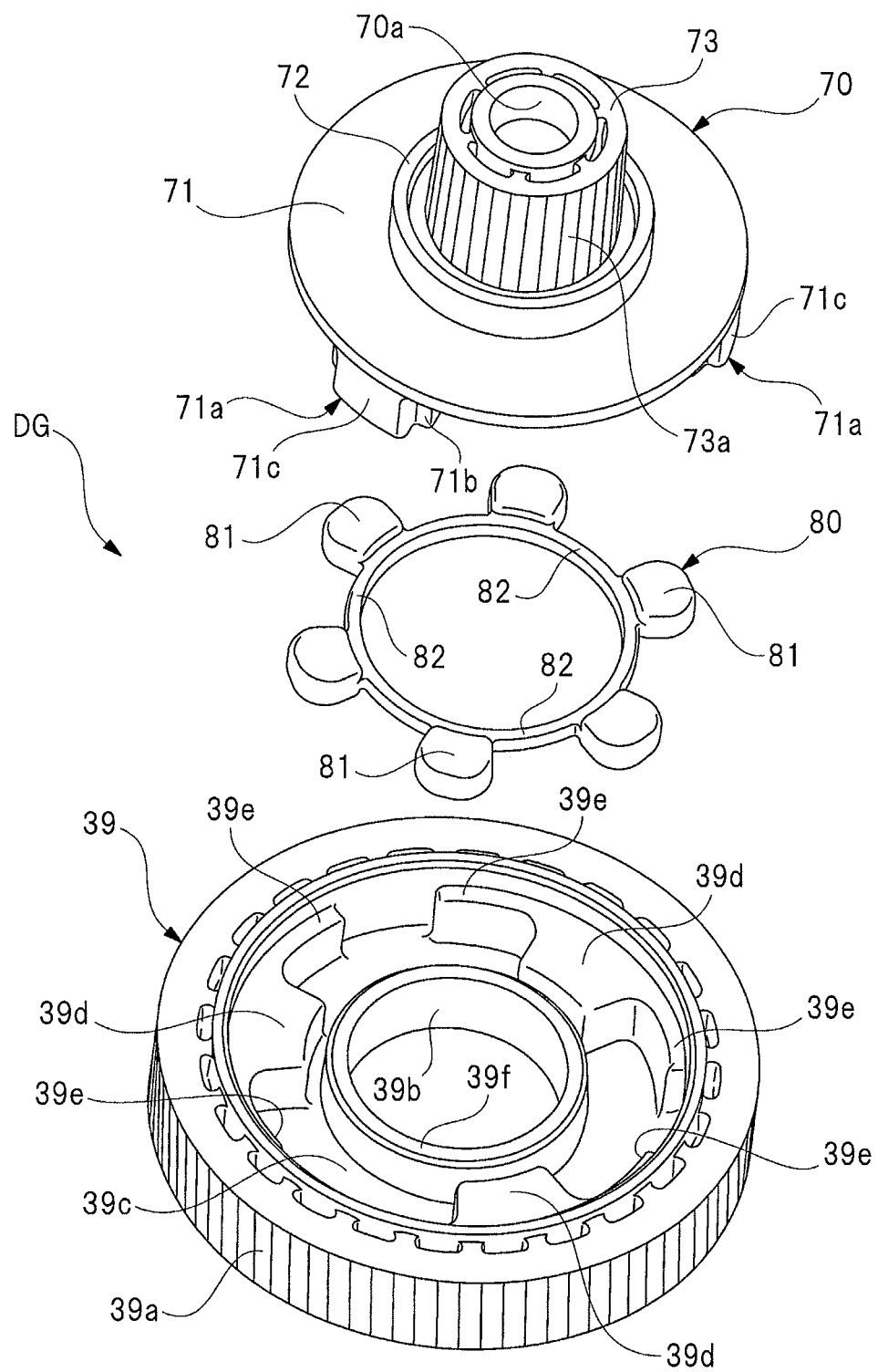
FIG. 4 is an exploded perspective view showing a worm wheel, a damper member, and an output member.
Figure 5:
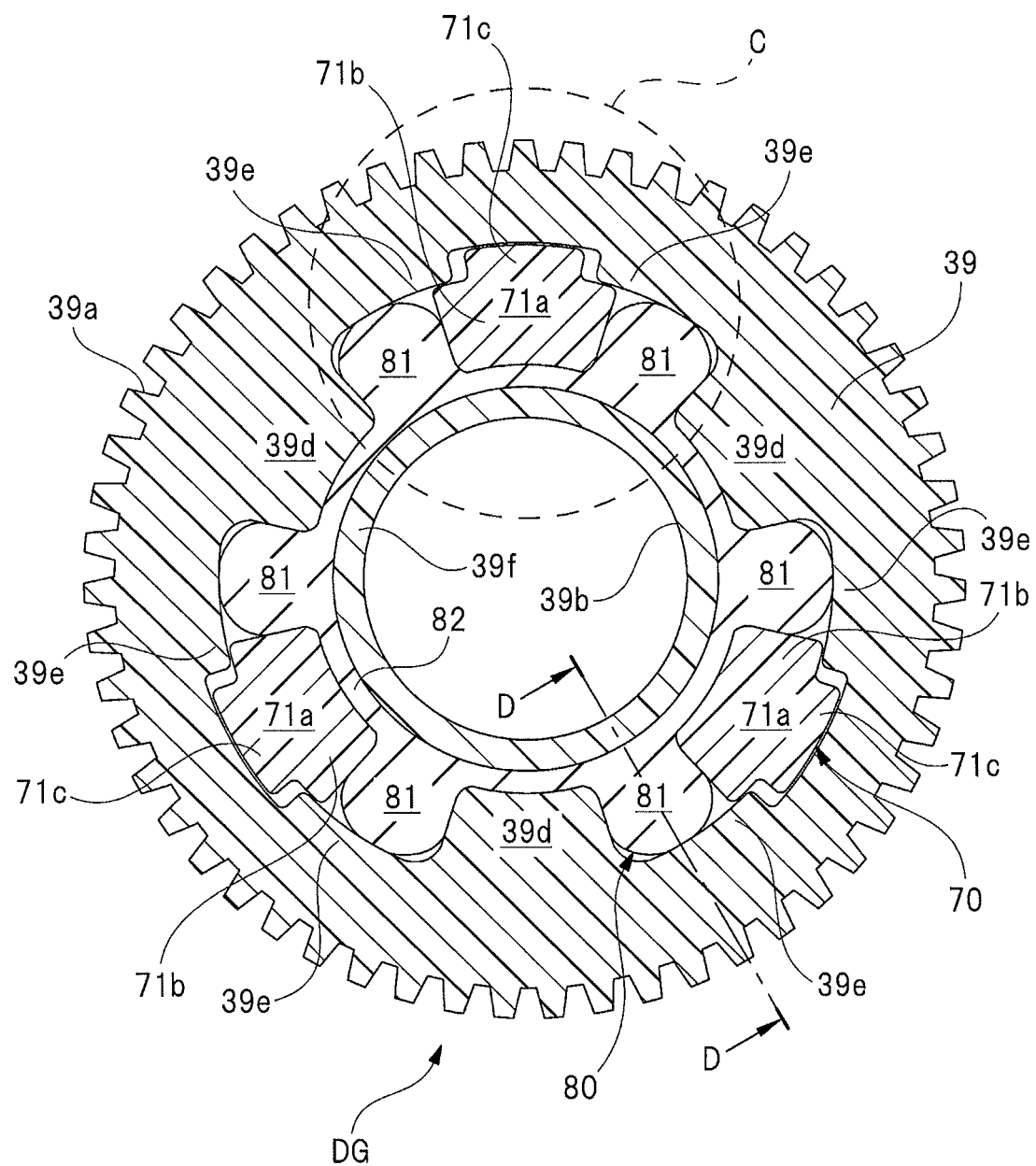
FIG. 5 is a cross-sectional view of the worm wheel, the damper member, and the output member taken along line B-B of FIG. 3.
Figure 6:
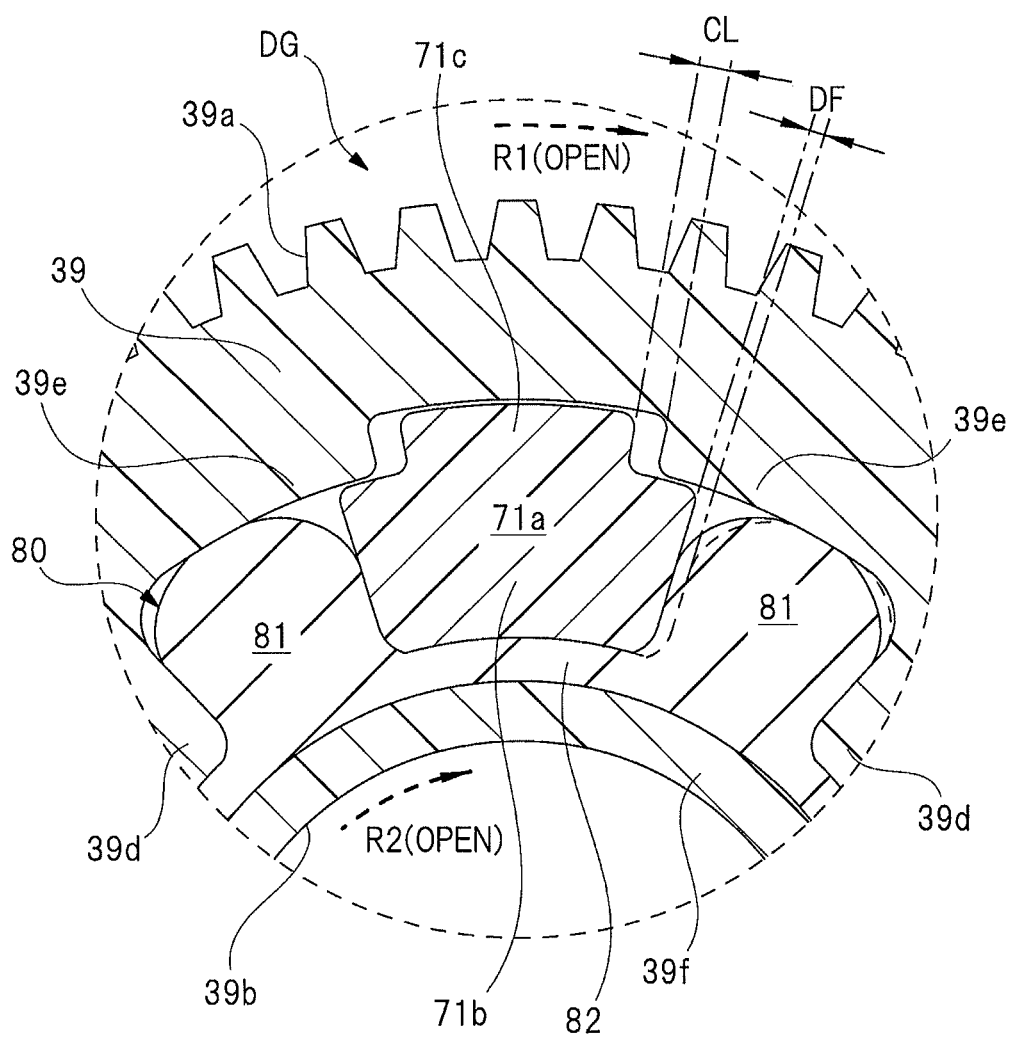
FIG. 6 is an enlarged view of a portion "C" surrounded by a dashed line circle of FIG. 5.
Figure 7:
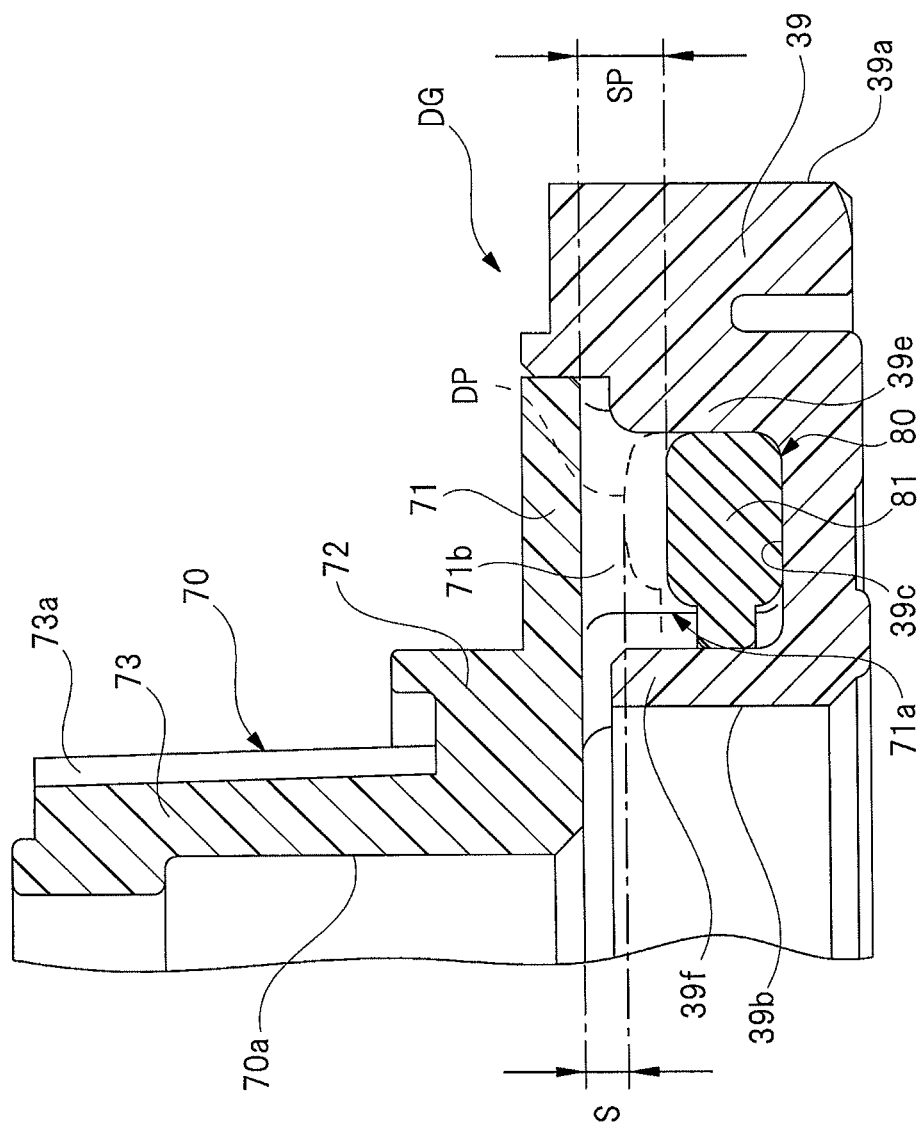
FIG. 7 is a cross-sectional view taken along line D-D of FIG. 5.
Figure 8:
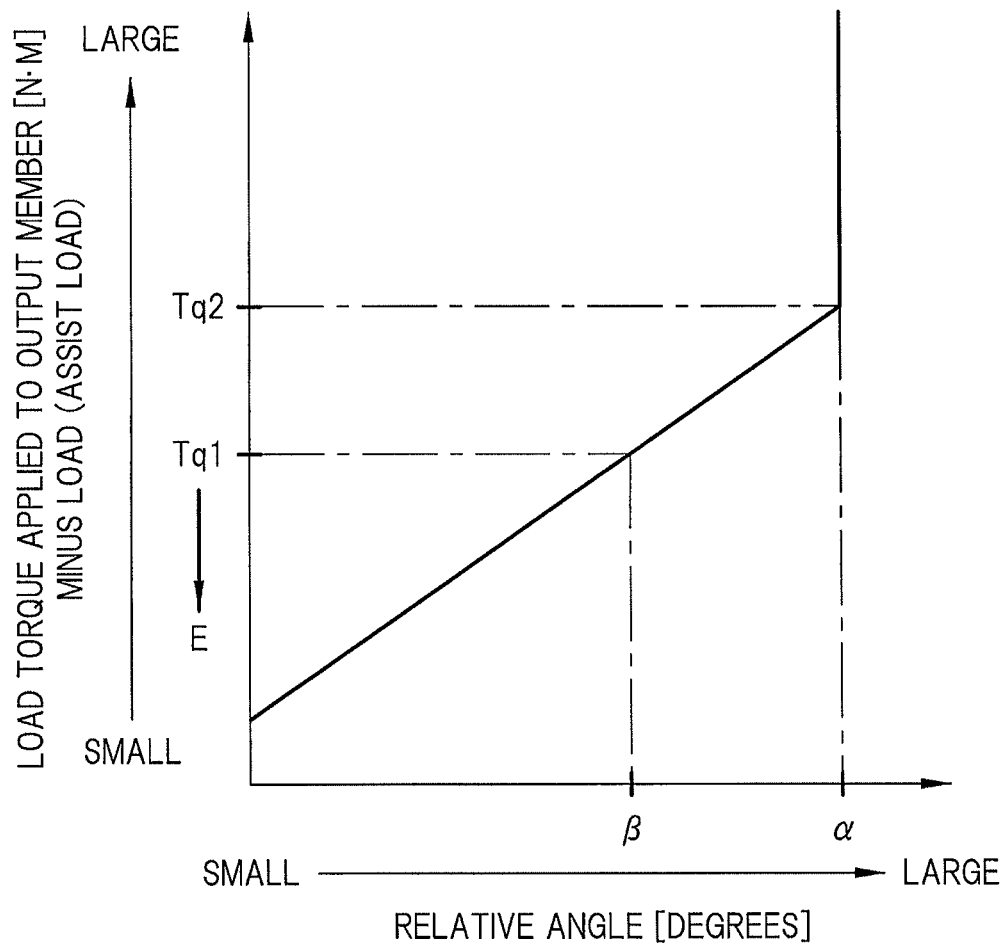
FIG. 8 is a graph showing characteristics of the damper member.

FIG. 1 is a schematic view showing a power window apparatus, FIG. 2 is a plan view showing a motor with speed reduction mechanism according to the present invention, FIG. 3 is a cross-sectional view taken along line A-A of FIG. 2, FIG. 4 is an exploded perspective view showing a worm wheel, a damper member, and an output member, FIG. 5 is a cross-sectional view of the worm wheel, the damper member, and the output member taken along line B-B of FIG. 3, FIG. 6 is an enlarged view of a portion "C" surrounded by a dashed line circle of FIG. 5, FIG. 7 is a cross-sectional view taken along line D-D of FIG. 5, and FIG. 8 is a graph showing characteristics of the damper member.

As shown in FIG. 1, a cable-type power window apparatus 11 is mounted on a side door 10 provided on a side surface of a vehicle such as automotive vehicle. The power window apparatus 11 is defines as an apparatus for electrically raising and lowering a window glass 12 provided in the door frame 10a of the side door 10. The power window apparatus 11 includes a power window motor 20 and a window regulator 60 driven by the power window motor 20.

The power window motor 20 includes a motor section 21 and a gear section 22, and the gear section 22 is provided with a drum 23 around which the drive cable 13 is wound. The window regulator 60 includes a guide rail 61 extending in a vertical direction of the side door 10, that is, in the ascending and descending directions of the window glass 12, and an upper pulley 62 and a lower pulley 63 each configured to turn back the moving direction of the drive cable 13 are rotatably mounted on the upper and lower sides of the guide rail 61.

A carrier plate 64 configured to support the lower end portion of the window glass 12 is slidably provided on the guide rail 61. One end portion 13a and the other end portion 13b of the drive cable 13 folded back by the upper pulley 62, and the lower pulley 63 are connected to the carrier plate 64.

In addition, by "opening" an operation switch (not shown) provided in the vehicle interior, the power window motor 20 is driven to be rotated in the positive direction, and the drum 23 is rotated in the clockwise direction. As a result, the other end portion 13b of the drive cable 13 is pulled, and the carrier plate 64 is lowered along the guide rail 61, as indicated by the dashed line arrow in the drawing. Therefore, the window glass 12 is lowered as indicated by the dashed line arrow in the drawing, and the window glass 12 is opened (OPEN operation).

On the other hand, by "closing" the operation switch, the power window motor 20 is driven to be rotated in the reverse direction, and the drum 23 is rotated in the counterclockwise direction. As a result, the one end portion 13a of the drive cable 13 is pulled, and the carrier plate 64 rises along the guide rail 61, as indicated by the solid line arrow in the drawing. Therefore, the window glass 12 rises as indicated by the solid line arrow in the drawing, and the window glass 12 is closed (CLOSE operation).

As shown in FIG. 2, the motor section 21 and the gear section 22 forming the power window motor 20 are connected to each other by a multiple of fastening screws 24, only two of which are shown in FIG. 2.

The motor section 21 includes a bottomed yoke 25 having a cross section formed into a substantially oval shape, which is not shown in detail. As a result, the entire power window motor 20 has a squamous shape, and it is mounted to a narrow space (not shown) inside the side door 10. The yoke 25 is formed by deep drawing (press molding) a metal plate having conductivity, and a pair of permanent magnets 26 each having a substantially arc-shaped cross section are provided on the inner side of the yoke 25 so as to face each other. A magnetic path (not shown) is formed by the permanent magnets 26 so as to pass through the yoke 25. An armature 27 is rotatably provided between the permanent magnets 26 so that a predetermined air gap is formed between the armature 27 and the permanent magnets 26. A coil 28 made of an enamel wire or the like is wound around the armature 27 in a predetermined number of turns and in a predetermined winding manner.

An armature shaft (rotation shaft) 29 is fixed to the rotation center of the armature 27, and extends so as to pass through it, and one end side (right side in the figure) of the armature shaft 29 in the axial direction is rotatably supported by a radial bearing 30 mounted on the bottom of the yoke 25. An axially-middle portion of the armature shaft 29 is rotatably supported by a radial bearing 33 provided to the brush holder 32. Furthermore, the other end side in the axial direction of the armature shaft 29 (left side in the figure) is rotatably supported by a radial bearing 41 mounted inside a gear case 31 forming part of the gear section 22.

A commutator 34 is integrally provided between the armature 27 and the radial bearing 33 along the axial direction of the armature shaft 29. The commutator 34 is formed by solidifying a multiple of commutator pieces 34a having conductivity in a cylindrical shape with a mold resin. The ends of the coils 28 are electrically connected to the commutator pieces 34a. As a result, by supplying a driving current from the commutator 34 to the coil 28, a solenoid force is generated in the armature 27, and the armature shaft 29 is rotated in the positive direction or the reverse direction at a predetermined rotation speed.

A brush holder 32 made of resin material such as plastic is mounted on the open side of the yoke 25. A pair of brushes 35 is provided to the brush holder 32 and freely movable in the radial direction, and each brush 35 is pressed toward the commutator 34 by the elastic force of each spring 36 in order to stably supply a driving current to the commutator 34.

A worm 38 is integrally rotatably provided to the other end side in the axial direction of the armature shaft 29. The worm 38 is rotatably provided inside the gear case 31, and a tooth portion 39a of a worm wheel 39 forming a reduction gear DG with a damper meshes with the worm 38. Note that the worm 38 and the worm wheel 39 form a speed reduction mechanism, which decelerates the rotation of the armature shaft 29 to a predetermined specified speed to increase the torque, and outputs the increased torque to the outside (the window regulator 60). This makes it possible to raise and lower the relatively heavy window glass 12.

The gear section 22 includes a gear case 31 connected to the yoke 25. As shown in FIG. 3, the gear case 31 is formed of resin material such as plastic in a bottomed substantially bathtub shape. A worm housing portion 40 is formed inside the gear case 31 and on the axial line of the armature shaft 29, and a worm 38 is rotatably housed in the worm housing portion 40.

In the gear case 31, a worm wheel housing portion 43 is formed adjacent to the worm housing portion 40, and a reduction gear DG with a damper is rotatably housed in the worm wheel housing portion 43. As a result, the worm 38 meshes with the tooth portion 39a of the worm wheel 39, and the rotation of the worm 38, that is, the rotation of the armature shaft 29 is transmitted to the worm wheel 39. A predetermined amount of grease (not shown) is applied between the worm 38 and the tooth portion 39a in order to smoothly engage with each other.

A support shaft 45 having a length dimension longer than the depth dimension of the worm wheel housing portion 43 is integrally provided to the center portion of the bottom wall portion 44 of the worm wheel housing portion 43. More specifically, the support shaft 45 extends in the axial direction of the reduction gear with damper DG, and the tip portion thereof is disposed outside the gear case 31. Note that the support shaft 45 is integrally molded with the gear case 31 at the time of molding the gear case 31. Therefore, the support shaft 45 is formed of resin material such as plastic.

The support shaft 45 includes a large diameter cylindrical portion 45a and a stepped small diameter cylindrical portion 45b in this order from the same side as the bottom wall portion 44. The large-diameter cylindrical portion 45a and the small-diameter cylindrical portion 45b respectively support the through hole 39b of the worm wheel 39 and the through hole 70a of the output member 70 forming the damped reduction gear DG, and the damped reduction gear DG is rotatably supported by the support shaft 45.

Note that hollow portions 46a and 46b are respectively provided radially inner of the large diameter cylindrical portion 45a and the small diameter cylindrical portion 45b. By providing the hollow portions 46a and 46b in this manner, the reduction in weight of the gear case 31 is realized, and distortion of the large diameter cylindrical portion 45a and the small diameter cylindrical portion 45b after molding of the gear case 31 is suppressed.

The bottom wall portion 44 is provided with an annular supporting convex portion 47 protruding in the same direction as the protruding direction of the support shaft 45. A worm wheel 39 slides on the supporting convex portion 47, and a predetermined amount of grease (not shown) is applied between the supporting convex portion 47 and the worm wheel 39. As a result, the worm wheel 39 can be smoothly rotated with respect to the gear case 31.

As shown in FIGS. 3 to 7, the reduction gear with damper DG is composed of a worm wheel 39, an output member 70, and a damper member 80. Specifically, an output member 70 made of resin material such as plastic is assembled to the worm wheel 39. A damper member 80 made of elastic material such as rubber is provided between the worm wheel 39 and the output member 70. Note that the worm wheel 39, the output member 70, and the damper member 80 are incorporated into the worm wheel housing portion 43 from the open side (the upper side in FIG. 3) of the gear case 31 in a sub-assembly state (see FIGS. 5 and 7) in which they are assembled to each other.

An annular recess 39c is formed radially inner of the worm wheel 39 so as to be recessed in the axial direction thereof. Three torque output portions 39d are integrally provided in the annular recess 39c. These torque output portions 39d project radially inner from the radially outer side of the worm wheel 39, and project from the bottom surface of the annular recess 39c toward the output member 70. The torque output portions 39d are arranged at equal intervals of 120 degrees in the circumferential direction of the worm wheel 39.

Stopper portions 39e configured to regulate the relative rotation of the output member 70 with respect to the worm wheel 39 by a predetermined angle ("α" degrees) or more are provided on both sides of each torque output portion 39d along the circumferential direction of the worm wheel 39. Similar to the torque output portion 39d, these stopper portions 39e project radially inner from the outside of the worm wheel 39 in the radial direction, and project from the bottom surface of the annular recess 39c toward the output member 70. However, the protrusion height of the stopper portion 39e along the radial direction of the worm wheel 39 is approximately ¼ of the protrusion height of the torque output portion 39d.

A cylindrical portion 39f configured to support the damper member 80 is provided radially inner of the worm wheel 39, and the cylindrical portion 39f also protrudes from the bottom surface of the annular recess 39c toward the output member 70. The protruding height of the cylindrical portion 39f in the axial direction does not exceed the thickness dimension along the axial direction of the worm wheel 39. Note that a through hole 39b that is supported by the large diameter cylindrical portion 45a of the support shaft 45 is formed radially inner of the cylindrical portion 39f.

The output member 70 include: from the same side as the worm wheel 39 along the axial direction thereof, a large diameter portion 71 formed into a substantially disk shape, a small diameter portion 72 formed into a substantially cylindrical shape; and a serration portion 73 formed so as to have a diameter smaller than the small diameter portion 72, the serration portion 73 having a serration 73a in the periphery thereof. Furthermore, a through hole 70a pivotally supported by the small diameter cylindrical portion 45b of the support shaft 45 is provided on the inner side in the radial direction of the output member 70. Three torque receiving portions 71a are integrally provided on the same side of the large diameter portion 71 as the worm wheel 39, which protrude toward the worm wheel 39, and enter between the torque output portion 39d and the stopper portion 39e adjacent to each other of the worm wheel 39 with the worm wheel 39 and the output member 70 assembled.

The torque receiving portions 71a are arranged at approximately equal intervals (approximately 120° intervals) along the circumferential direction of the large diameter portion 71. As shown in FIGS. 5 and 6, each of the torque receiving portions 71a is provided with a main body portion 71b and a rotation regulating portion 71c. The main body portion 71b enters between the adjacent torque output portions 39d, and the width dimension of the main body portion 71b along the circumferential direction is substantially the same as the width dimension of the torque output portion 39d along the circumferential direction.

Furthermore, the rotation regulating portion 71c is provided on the outer side of the main body portion 71b in the radial direction of the output member 70, and enters between the adjacent stopper portions 39e. The width dimension of the rotation regulating portion 71c along the circumferential direction is smaller than the width dimension of the adjacent stopper portions 39e along the circumferential direction. As a result, as shown in FIG. 6, a predetermined clearance CL is formed between the stopper portion 39e and the rotation regulating portion 71c with the output member 70 located at standard position with respect to the worm wheel 39.

Note that the clearance CL determines a limit angle of relative rotate (predetermined angle) of the output member 70 with respect to the worm wheel 39, and in the present embodiment, the predetermined angle is "α" degrees (see FIG. 8). A state shown in FIG. 6 shows a normal condition of the output member 70 with respect to the worm wheel 39, and the clearance CL is formed on both sides of the rotation regulating portion 71c along the rotation direction of the damper-equipped reduction gear DG so as to be mirror-symmetrical. That is, the output member 70 is rotatable with respect to the worm wheel 39 by "α" degrees in the positive direction and the reverse direction, respectively, from the normal condition shown in FIG. 6.

As shown in FIG. 3, the small diameter portion 72 is provided on the opposite side to the torque receiving portion 71a along the axial direction of the large diameter portion 71 and the lip portion 52a of the annular seal 52 is in sliding contact with the periphery of the small diameter portion 72. Note that the annular seal 52 seals the opening of the gear case 31 (the upper side in FIG. 3), thereby preventing rainwater or the like from entering the inside of the gear case 31. In this manner, the lip portion 52a is slid around the small diameter portion 72 to suppress an increase in rotational resistance of the reduction gear with damper DG and to secure sufficient sealing property. The annular seal 52 is supported by a base member 53 made of an annular steel plate, and the base member 53 is fitted to the open side of the gear case 31.

The serration portion 73 functions as an output unit of the power window motor 20, and the serration 73a of the serration portion 73 is engaged with the inner side in the radial direction of the drum 23 forming the window regulator 60. As a result, the drum 23 is rotated by driving the power window motor 20, and thus the window regulator 60 is operated.

Note that as shown in FIG. 3, the through hole 70a of the output member 70 is stepped, and an O-ring (sealing member) 51 made of rubber material is mounted between the stepped portion of the through-hole 70a and the stepped portion of the small diameter cylindrical portion 45b. The O-ring 51 seals the space between the output member 70 and the support shaft 45, thereby preventing rainwater or the like from entering the gear case 31 through the space between the output member 70 and the support shaft 45.

As shown in FIG. 4, the damper member 80 includes six damper pieces 81 and six connecting portions 82 for connecting adjacent damper pieces 81 to each other. The six damper pieces 81 and the six coupling portions 82 are alternately arranged at equal intervals of 30 degrees along the circumferential direction of the worm wheel 39, and the damper pieces 81 are provided to project radially outward with respect to the respective coupling portions 82. As shown in FIG. 5, each of the damper pieces 81 is disposed between the torque output portion 39d and the main body portion 71b of the torque receiving portion 71a, which are alternately disposed along the rotation direction of the damper-attached reduction gear DG in a state in which the damper-attached reduction gear DG is assembled.

Note that each damper piece 81 is held between the torque output portion 39d and the main body portion 71b in a slightly elastically deformable state. As a result, both sides of the damper piece 81 along the circumferential direction of the damper-equipped reduction gear DG are in close contact with the torque output portion 39d and the main body portion 71b, respectively. Furthermore, the distal end side of each damper piece 81, that is, the outer side of each damper piece 81 in the radial direction is closely adhered to the inner side of the stopper portion 39e in the radial direction.

As described above, as shown in FIG. 6, each damper piece 81 is provided between the torque output portion 39d, the main body portion 71b, the stopper portion 39e, and the cylindrical portion 39f so as to be in close contact with each other. Accordingly, the worm wheel 39 and the output member 70 are regarded as having no so-called play (gata) in the rotational direction thereof. When the worm wheel 39 is rotated in the positive direction or the reverse direction, a rotate force is transmitted from the torque output portion 39d to the torque receiving portion 71a via the damper piece 81. On the contrary, when a sudden rotate force is transmitted from the output member 70, the damper piece 81 is elastically deformed, and the transmission of the impact to the worm wheel 39 and the worm 38 is alleviated.

Furthermore, as shown in FIG. 7, with the reduction gear with damper DG assembled, a gap portion SP is formed between the damper piece 81 and the large diameter portion 71 along the axial direction of the reduction gear with damper DG. That is, the gap portion SP is provided between the worm wheel 39 and the output member 70. The gap portion SP constitutes a bulged portion housing portion in the present invention, and is disposed within a projected area range of the damper piece 81 along the axial direction of the damper-equipped reduction gear DG. Therefore, similarly to the damper piece 81, the gap portion SP is surrounded by the torque output portion 39d, the main body portion 71b, the stopper portion 39e, and the cylindrical portion 39f.

When the output member 70 is abruptly rotated in the positive direction or the reverse direction with respect to the worm wheel 39 and rotated with respect to the worm wheel 39, the damper piece 81 is elastically deformed so as to be crushed. As a result, the portion DP (dashed line portion of FIG. 7) inflated by the elastic deformation of the damper piece 81 enters the gap portion SP and is received. Note that when the output member 70 is rotated with respect to the worm wheel 39 in the positive direction or in the reverse direction, and the rotation regulating portion 71c of the output member 70 comes into contact with the stopper portion 39e of the worm wheel 39 each of the damper pieces 81 is in a state elastically deformed to the greatest extent. In other words, when the output member 70 is rotated with respect to the worm wheel 39 by the predetermined angle "α" degrees, i.e., by the clearance CL disappears, the amount of swelling of the portion DP swelled by the elastic deformation of the damper piece 81 becomes the maximum value.

After that, even if the output member 70 is rotated with respect to the worm wheel 39 by a predetermined angle "α" degrees, and the amount of expansion of the portion DP expanded by the elastic deformation of the damper piece 81 reaches a maximum value, as shown in FIG. 7, a predetermined gap S is formed between the portion DP expanded by the elastic deformation and the large diameter portion 71 of the output member 70, so that the damper piece 81 does not push the output member 70. That is, even when the damper piece 81 is elastically deformed to the greatest extent, the pressing force does not act in the axial direction of the output member 70 in the direction in which the output member 70 is pulled away from the worm wheel 39.

As described above, when the relative rotation of the output member 70 with respect to the worm wheel 39 increases, the rotation regulating portion 71c abuts on the stopper portion 39e, and further relative rotation is regulated, so that further elastic deformation of the damper piece 81 is suppressed. Therefore, the damper member 80 is not forcibly elastically deformed, the damper member 80 can be protected, and the initial shear modulus of the damper member 80 can be maintained for a long period of time.

Note that shear modulus of the damper member 80 is determined as follows. For example, when the power window motor 20 is driven so as to rotate in the positive direction by "opening operation" of the operation switch, the worm wheel 39 is rotated in the direction of the dashed line arrow R1 as shown in FIG. 6. Then, the rotational force is transmitted from each torque output portion 39d to the main body portion 71b of each torque receiving portion 71a via each damper piece 81. As a result, the output member 70 is rotated in the direction indicated by the dashed line arrow R2, and the window glass 12 is lowered and opened (OPEN operation).

At this time, as shown in FIG. 8, a load torque Tq1 having a magnitude corresponding to the weight of the window glass 12 is applied to the output member 70 via the window regulator 60. The load torque Tq1 acts to rotate the output member 70 in the direction of the dashed line arrow R2 shown in FIG. 6. That is, it acts in the same direction as the direction in which the rotate force of the power window motor 20 acts. In other words, it can be said that the load torque Tq1 is a "negative load (assist load)" acting on the power window motor 20.

When the load torque Tq1 acts on the output member 70, the relative angle of the output member 70 with respect to the worm wheel 39 becomes β degrees (β<α), and as shown in FIG. 6, each damper piece 81 is elastically deformed by the deformation amount DF (DF<CL). Note that as shown in FIG. 8, the load torque Tq1 having a magnitude corresponding to the weight of the window glass 12 is smaller than the load torque Tq2 (relative angle is "α" degrees) transmitted from the output member 70 having a magnitude enough to cause the rotation regulating portion 71c (output member 70) to abut on the stopper portion 39e. That is, shear modulus of the damper member 80 is determined so as to satisfy the following expression: Tq1<Tq2.

As a result, even if the load torque Tq1 having a magnitude corresponding to the weight of the window glass 12 is applied to the output member 70, the rotation regulating portion 71c does not come into contact with the stopper portion 39e, and sufficient silence is ensured. Furthermore, since the transmission of the load torque Tq1 to the worm wheel 39 is suppressed, the backlash between the tooth portion 39 a of the worm wheel 39 and the worm 38 is suppressed.

Therefore, it is possible to protect the speed reduction mechanism (the worm 38 and the worm wheel 39) while suppressing the generation of the hitting sound (mechanical noise) of the gear, and further to suppress the rattling between the output member 70 and the worm wheel 39, thereby making it possible to further improve the quietness of the power window motor 20.

If the operating resistance of the wind regulator 60 or the sliding resistance of the window glass 12 with respect to the door frame 10a (see FIG. 1) is large, the load torque Tq1 is shifted in the direction of the arrow E shown in FIG. 8 (in a smaller direction). That is, when the operating resistance of the window regulator 60 and the sliding resistance of the window glass 12 with respect to the door frame 10a are large, the so-called "negative load (assist load)" becomes small. In consideration of this point as well, shear modulus of the damper member 80 is determined.

As shown in FIG. 3, the drum 23 integrally rotatably mounted on the serration portion 73 of the output member 70 is covered with a drum cover 54 formed into a substantially bathtub shape by resin material such as plastic. As shown in FIGS. 2 and 3, three case mounting holes 54a are integrally provided in the drum cover 54, and mounting bolts 55 respectively pass through the case mounting holes 54a. Three mounting nuts 31a are attached to the gear case 31 corresponding to the case mounting holes 54a, and the drum cover 54 is assembled to the gear case 31 by screwing the mounting bolts 55 to the mounting nuts 31a, respectively.

The drum cover 54 is integrally provided with three mounting legs 54b, and anchor bolts 56 extend so as to penetrate the respective mounting legs 54b. The power window motor 20 is attached to the door panel 10b (vehicle body) by screwing the anchor bolt 56 to the panel nut 10c of the door panel 10b provided inside the side door 10.

A drum housing portion 57 configured to cover the rotating drum 23 is formed in the drum cover 54, and a cylinder 57a configured to support the output member 70 from the axial direction is provided at a substantially central portion of the drum housing portion 57. That is, the output member 70 is supported in the axial direction by the drum cover 54. The cylinder 57a is disposed coaxially with the support shaft 45 of the gear case 31 and protrudes toward the output member 70. The distal end portion of the small diameter cylindrical portion 45b of the support shaft 45 is inserted into the inner side of the cylindrical portion 57a in the radial direction, thereby suppressing the axial shift of the support shaft 45.

Furthermore, as shown in FIG. 3, the distal end portion of the cylinder 57a is in contact with the radially inner portion of the serration portion 73 of the output member 70. As a result, the contact portion (sliding contact area) between the cylinder 57a and the output member 70 is reduced, and the increase in rotational resistance of the output member 70 (the reduction gear with damper DG) is reduced in size.

An annular supporting convex portion 59 protruding in the same direction as the protruding direction of the cylindrical portion 57 is provided around the cylinder 57a of the drum cover 54. The support convex portion 59 is configured to rotatably support the drum 23 between the small diameter portion 72 of the output member 70, and a predetermined amount of grease (not shown) is applied to the support convex portion assembling the power window motor 20. As a result, the drum 23 can be smoothly rotated with respect to the drum cover 54.

As described above in detail, according to the power window motor 20 of the first embodiment, since the damper member 80 elastically deformed by the relative rotate between the worm wheel 39 and the output member 70 is provided between the worm wheel 39 and the output member 70, and the gap SP accommodating the portion DP expanded by the elastic deformation of the damper member 80 is provided between the worm wheel 39 and the output member 70, the portion DP expanded by the elastic deformation of the damper member 80 is not pressed so as to separate the output member 70 from the worm wheel 39.

This eliminates the require of immovably fixing the output member 70 in the axial direction of the support shaft 45 by using the fastening member as in the past while providing the damper member 80, thereby making it possible to reduce the intensity of the support shaft 45, thereby making it possible to achieve excellent impact resistance and silence, while being improved in production cost.

Furthermore, according to the power window motor 20 of the first embodiment, there are provided a drum 23 in which the drive cable 13 for driving the window glass 12 is wound around the outer circumference portion, a drum cover 54 for covering the drum 23, and the output member 70 is supported in the axial direction by the drum cover 54.

As a result, it is possible to prevent the output member 70 from rattling in the axial direction while unnecessary the need for the fastening member as in the past, and to further improve the silence of the power window motor 20.

Furthermore, according to the power window motor 20 of the first embodiment, since the worm wheel 39 is provided with the stopper portion 39e configured to restrict the relative rotation of the output member 70 by a predetermined angle "α" degrees or more, a large load (overload) is prevented from being applied to the damper member 80, thereby protecting damper member 80.

As a result, the life of the damper member 80 can be extended, and thus the maintenance cycle of the power window motor 20 can be extended.

Furthermore, in the power window motor 20 according to the first embodiment, when the load torque having a magnitude corresponding to the weight of the window glass 12 out of the load torque transmitted from the output member 70 to the damper member 80 is defined as Tq1, and the load torque having a magnitude that causes the rotation regulating portion 71c of the output member 70 to abut on the stopper portion 39e is defined as Tq2, the equation of Tq1<Tq2 is satisfied.

As a result, the rotation regulating portion 71c does not come into contact with the stopper portion 39e, and the power window motor 20 is improved in quietness. Furthermore, since the transmission of the load torque Tq1 to the worm wheel 39 is suppressed, it is possible to suppress the backlash between the tooth portion 39a of the worm wheel 39 and the worm 38 from becoming clogged. Therefore, it is possible to protect the speed reduction mechanism while suppressing the generation of the hitting noise of the gear, and furthermore, it is possible to suppress the rattling between the output member 70 and the worm wheel 39, thereby further improving the quietness of the power window motor 20.

Next, the second embodiment of the present invention will be described in detail with reference to the drawings. Portions the same in function as those of the first embodiment described above are denoted by the same reference numerals, and detailed explanation thereof is omitted.

Figure 9:
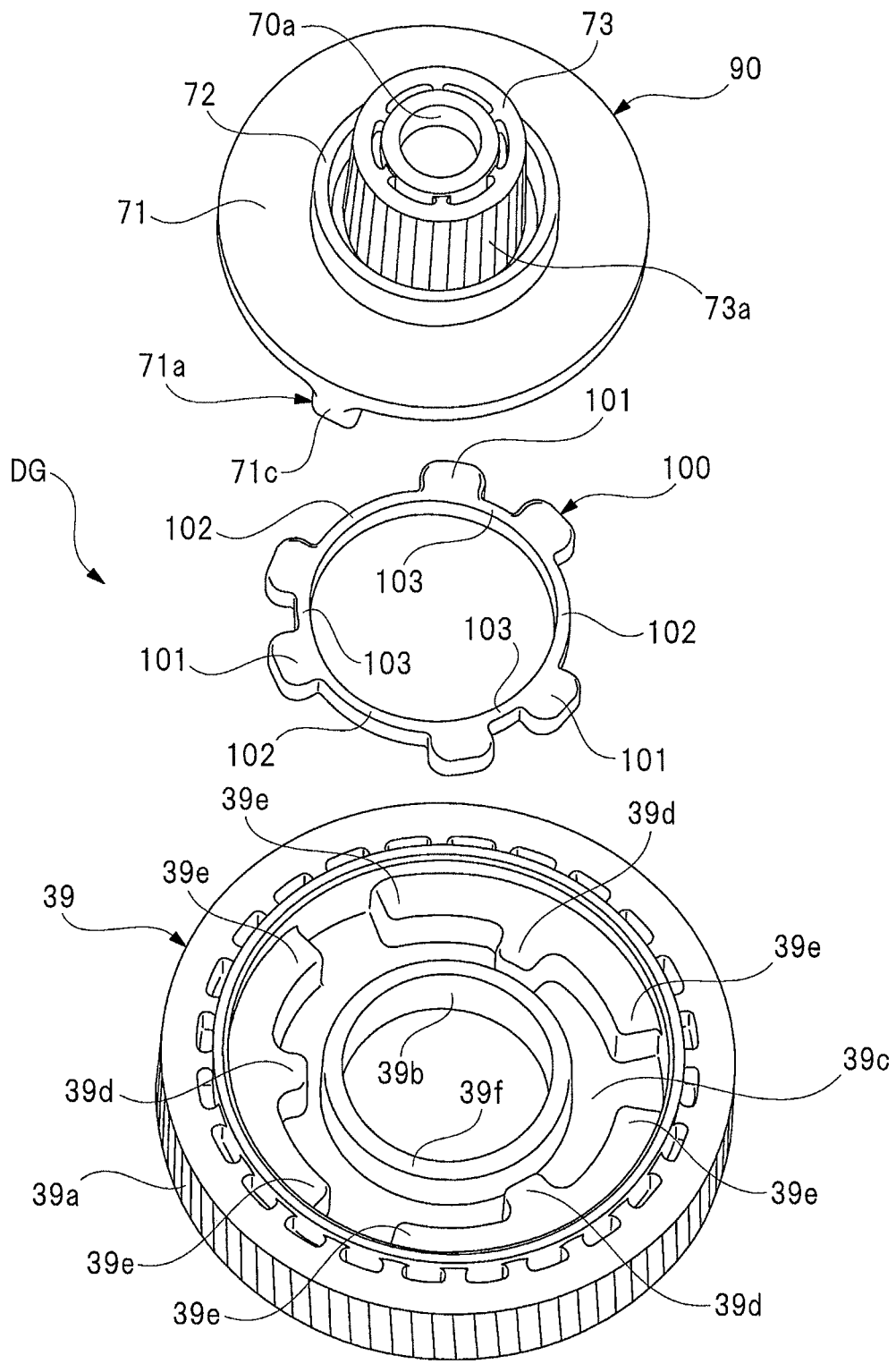
FIG. 9 is an exploded perspective view corresponding to FIG. 4 in the second embodiment.
Figure 10:
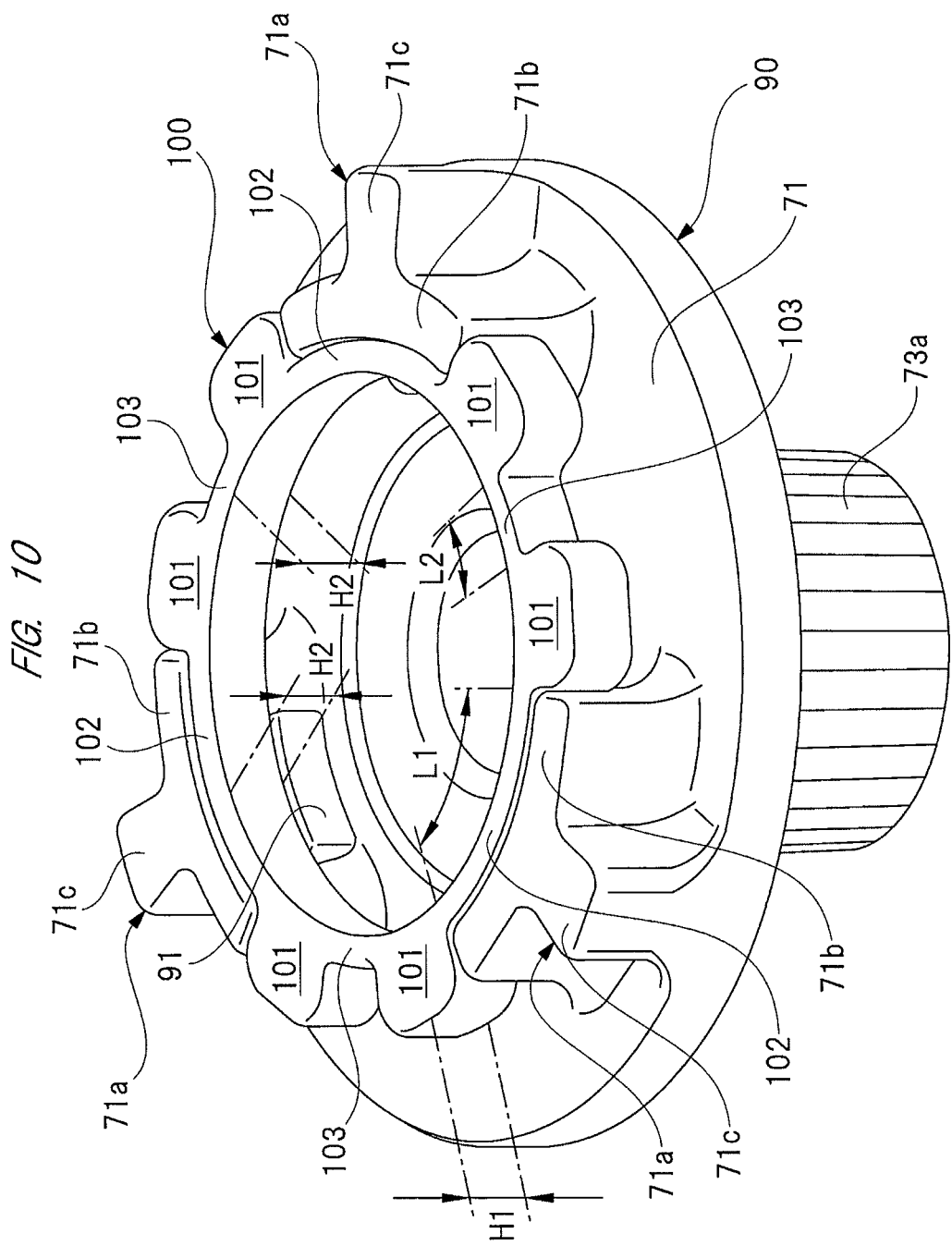
FIG. 10 is a perspective view showing an assembled state of the damper member and the output member of FIG. 9.
Figure 11:
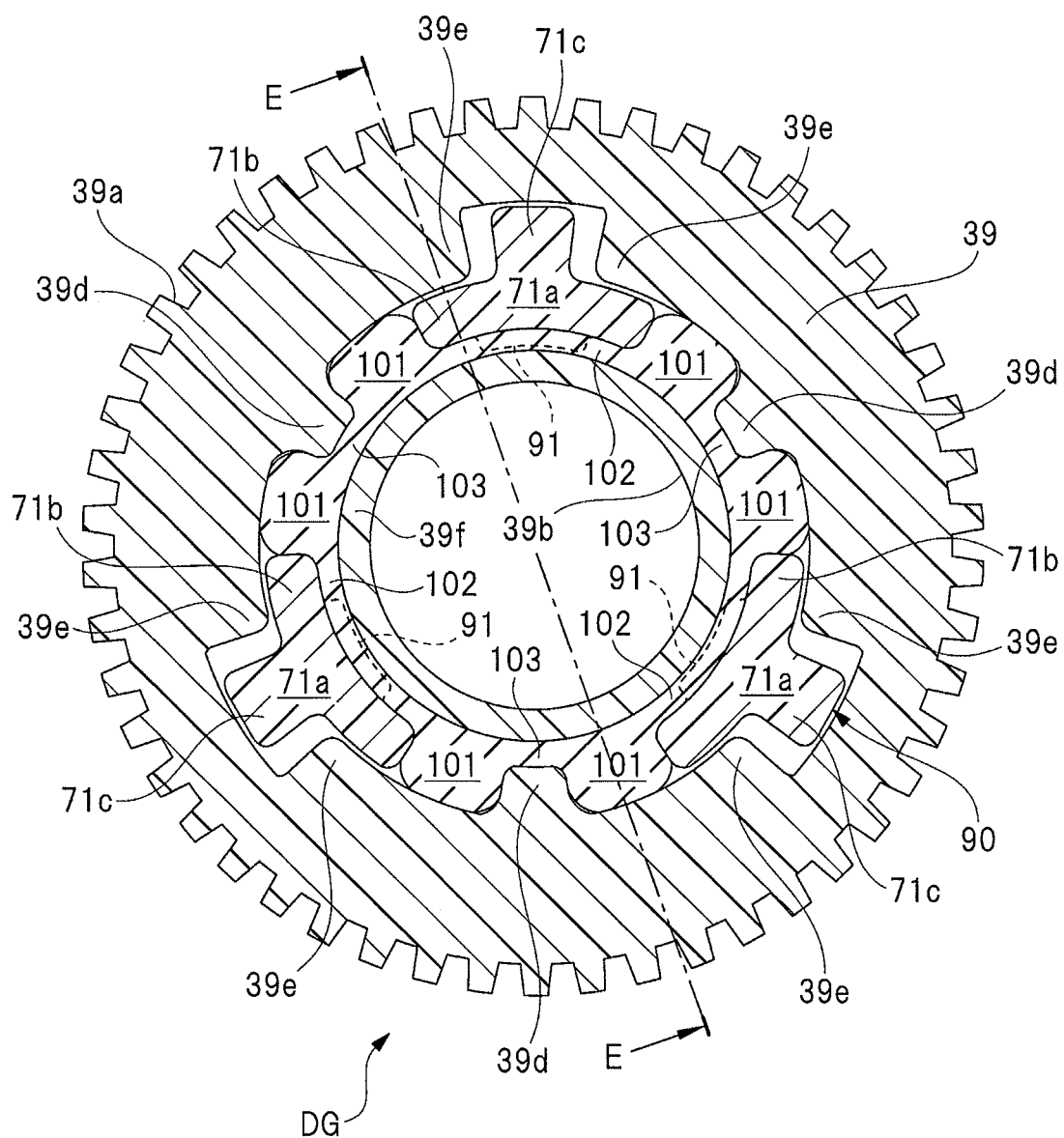
FIG. 11 is a cross-sectional view corresponding to FIG. 5 in the second embodiment.
Figure 12:
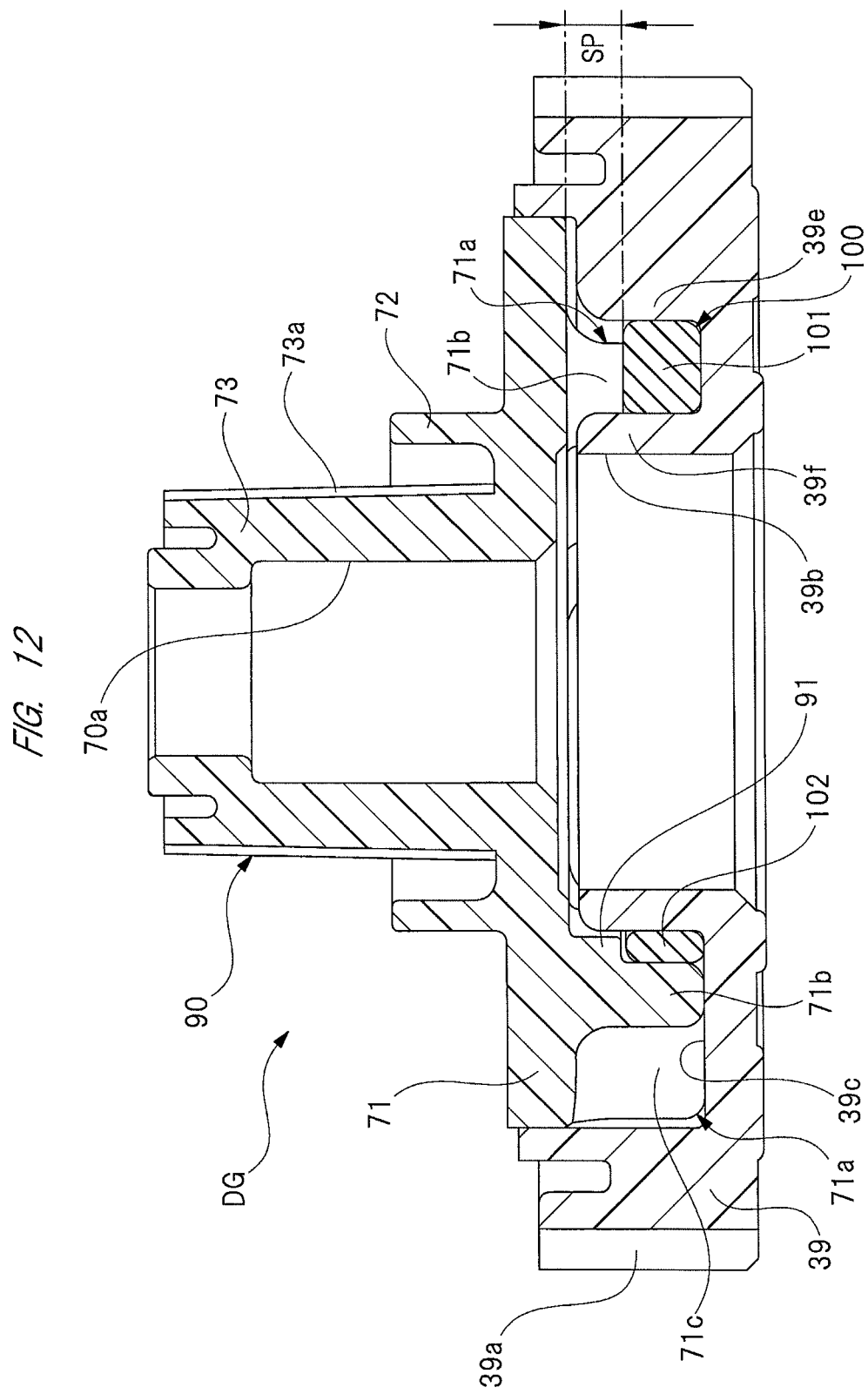
FIG. 12 is a cross-sectional view taken along line E-E of FIG. 11.

FIG. 9 is an exploded perspective view corresponding to FIG. 4 of the second embodiment, FIG. 10 is a perspective view showing an assembled state of the damper member and the output member of FIG. 9, FIG. 11 is a cross-sectional view corresponding to FIG. 5 of the second embodiment, and FIG. 12 is a cross-sectional view along the line E-E of FIG. 11.

As shown in FIGS. 9 to 12, the second embodiment differs from the first embodiment in particular in shapes of the output member 90 and the damper member 100.

As shown in FIGS. 10 and 11, the torque receiving portion 71a of the output member 90 is integrally provided with a movement regulating portion 91. Specifically, the movement regulating portion 91 is provided in each of the three torque receiving portions 71a and protrudes radially inner of the output member 90. These movement regulating portions 91 regulate the movement of the first coupling portions 102 (damper member 100) along the axial direction of the worm wheel 39 (see FIG. 9).

Furthermore, the distal end side of the movement regulating portion 91 is disposed close to the radially outer part of the cylindrical portion 39f of the worm wheel 39. Furthermore, a slight gap is formed between the movement regulating portion 91 and the cylindrical portion 39f, thereby facilitating the assembly of the output member 90 to the worm wheel 39 and suppressing rattling of the output member 90 to the worm wheel 39. Thus, the power window motor 20 (see FIGS. 2 and 3) is improved in quietness.

As shown in FIGS. 10 to 12, the damper member 100 includes six damper pieces 101 and first and second connecting portions 102 and 103 for connecting adjacent damper pieces 101 to each other. Each of these first and second connections 102 and 103 is provided in triplicate and a total of six.

As shown in FIG. 10, the length L1 of the first coupling portions 102 along the circumference of the worm wheel 39 is longer than the length L2 of the second coupling portions 103 along the circumference of the worm wheel 39 (L1>L2). The thickness dimension H1 of the damper piece 101 along the axial direction of the worm wheel 39 is the same as the thickness dimension H2 of the first and second coupling portions 102 and 103 along the axial direction of the worm wheel 39.

Furthermore, as shown in FIG. 11, the three first coupling portions 102 are respectively disposed between the cylindrical portion 39f of the worm wheel 39 along the radial direction of the worm wheel 39 and the torque receiving portion 71a of the output member 90. On the other hand, the three second coupling portions 103 are respectively disposed between the cylindrical portion 39f of the worm wheel 39 along the radial direction of the worm wheel 39 and the torque output portion 39d of the worm wheel 39.

In addition, as shown in FIG. 12, the three first coupling portions 102 are disposed between the annular recess 39c of the worm wheel 39 along the axial direction of the worm wheel 39 and the movement regulating portion 91 of the output member 90.

That is, as shown in FIGS. 11 and 12, the three first coupling portions 102 are surrounded by both the worm wheel 39 and the output member 90 with the power window motor 20 assembled so that there is almost no gap from the axial direction and the radial direction. This prevents the damper member 100 from rattling in the axial direction and the radial direction between the worm wheel 39 and the output member 90 when the power window motor 20 is operated or the like.

As described above in detail, the power window motor 20 according to the second embodiment can also exhibit the same operation and effect as those of the power window motor 20 according to the first embodiment described above.

In addition, in the power window motor 20 according to the second embodiment, the output member 90 is provided with a movement regulating portion 91 configured to regulate the movement of the first coupling portions 102 along the axial direction of the worm wheel 39. Therefore, it is possible to reliably prevent the damper member 100 from rattling in the axial direction between the worm wheel 39 and the output member 90 when the power window motor 20 is operated or the like. Therefore, the power window motor 20 can be further improved in quietness.

In the power window motor 20 according to the second embodiment, the thickness H1 of the damper piece 101 along the axial direction of the worm wheel 39 and the thickness H2 of the first and second couplings 102 and 103 along the axial direction of the worm wheel 39 are respectively of the same thickness (H1=H2). As a result, the damper member 100 can be increased in rigidity. Therefore, it is possible to reliably prevent the damper member 100 from being unnecessarily deformed or twisted at the time of assembling the power window motor 20 or the like. Therefore, it is possible to improve the assembling workability of the power window motor 20 and improve its process yield.

It is needless to say that the present invention is not limited to the above-mentioned embodiments, and various modifications can be made without departing from the gist thereof.

For example, in each of the embodiments described above, the motor with the speed reduction mechanism is applied to the power window motor 20 of the power window apparatus 11 configured to raise and lower the window glass 12 of the vehicle, but the present invention is not limited to this, and can be applied to a drive source such as an electric sunroof apparatus or a slide door apparatus mounted on the vehicle.

In addition, the material, shape, dimension, number, installation place, and the like of each component in each of the above embodiments are arbitrary as long as the present invention can be achieved, and are not limited to each of the above embodiments.

The motor with speed reduction mechanism is used to drive an object such as window glass or sunroof as a driving source of a power window apparatus or an electric sunroof apparatus mounted on a vehicle such as automotive vehicle.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A motor with speed reduction mechanism, comprising: a motor section having a rotation shaft; and a gear section having a speed reduction mechanism configured to reduce a rotation of the rotation shaft, wherein the motor with speed reduction mechanism comprises:
   a worm that is rotated by the rotation shaft;
   a worm wheel that is rotated by said worm;
   an output member configured to output a rotation of the worm wheel to the outside;
   a damper member provided between the worm wheel and the output member and elastically deformed by a relative rotation of the worm wheel and the output member; and
   a bulged portion housing portion provided between the worm wheel and the output member, a portion bulged by elastic deformation of the damper member being housed in the bulged portion housing portion,
   wherein the bulged portion housing portion is provided so that even when an amount of swelling of the bulged portion in a bulged direction becomes a maximum value, the damper member does not push the output member in the bulged direction.

2. The motor with speed reduction mechanism according to claim 1, comprising:
   a torque output portion provided on the worm wheel and protruding toward the output member, and
   a torque receiving portion provided on the output member and protruding toward the worm wheel, wherein
   the damper member is provided between the torque output portion and the torque receiving portion along the rotation direction of the worm wheel,
   the bulged portion housing portion is provided between the damper member and the output member along an axial direction of the worm wheel.

3. The motor with speed reduction mechanism according to claim 1, comprising:

a drum provided to the output member and configured to drive an object, a cable being wound around an outer circumference portion of the drum, and a drum cover covering the drum, wherein the output member is axially supported by the drum cover.

4. The motor with speed reduction mechanism according to claim 1, wherein the worm wheel is provided with a stopper portion configured to restrict the relative rotation of the output member by a predetermined angle or more.

5. The motor with speed reduction mechanism according to claim 4, wherein a load torque to be transmitted from the output member to the damper member satisfies the following expression, when a load torque corresponding to a weight of the object is defined as Tq1, and a load torque of a magnitude necessary to cause the output member to abut on the stopper portion is defined as Tq2, Tq1<Tq2.

6. The motor with speed reduction mechanism according to claim 1, wherein the damper member includes: a multiple of damper pieces elastically deformed between the worm wheel and the output member; and a connecting portion connecting adjacent damper pieces to each other, wherein the output member includes a movement regulating portion configured to regulate a movement of a coupling portion along the axial direction of the worm wheel.

7. The motor with speed reduction mechanism according to claim 6, wherein the coupling portion is provided between the worm wheel and the movement regulating portion along the axial direction of the worm wheel.

8. The motor with speed reduction mechanism according to claim 1, wherein the damper member includes: a multiple of damper pieces elastically deformed between the worm wheel and the output member; and a connecting portion connecting adjacent damper pieces to each other, the thickness dimension of the damper piece along the axial direction of the worm wheel and the thickness dimension of the connecting portion are the same as each other.

* * * * *